United States Patent [19]
Park

[11] Patent Number: 5,638,929
[45] Date of Patent: Jun. 17, 1997

[54] CONTROLLABLE ONE-WAY CLUTCH FOR A VEHICLE

[75] Inventor: Dong-Hoon Park, Kyungki-Do, Rep. of Korea

[73] Assignee: Hyundai Motor Company, Ltd., Seoul, Rep. of Korea

[21] Appl. No.: 418,030

[22] Filed: Apr. 6, 1995

[51] Int. Cl.$^6$ .................................................. F16D 15/00
[52] U.S. Cl. ......................... 192/44; 192/45; 192/28 AT; 192/30 V; 192/52.6
[58] Field of Search .................... 192/30 V, 38, 192/44, 45, 47, 52.6, 85 AT, 107 T

[56] References Cited

U.S. PATENT DOCUMENTS

| | | | |
|---|---|---|---|
| 2,172,653 | 9/1939 | Flogaus | 192/45 |
| 2,747,433 | 5/1956 | Forster | 192/44 X |
| 3,019,872 | 2/1962 | Morris et al. | 192/44 |
| 3,625,324 | 12/1971 | Scharf | 192/45 |
| 4,050,560 | 9/1977 | Torstenfelt | 197/47 |

*Primary Examiner*—Rodney H. Bonck
*Assistant Examiner*—Saul Rodriguez

[57] ABSTRACT

A controllable clutch includes a plurality of piston members, a plurality of oil passages communicating with the piston members and a plurality of grooves for receiving a roller from the piston members. The piston members are disposed in one of an inner race and an outer race. The pistons in the piston member can extend in the same rotational direction to form a one-way clutch in that direction. Alternatively, the pistons in the piston members can extend in opposite rotational directions to form a clutch. Or, by selectively applying hydraulic fluid to the piston members, a one-way clutch can selectively be formed in either rotational direction.

58 Claims, 6 Drawing Sheets

CONTROLLABLE ONE-WAY CLUTCH FOR A VEHICLE

BACKGROUND OF THE INVENTION

1. Field of the Invention

The present invention relates to a controllable one-way clutch for a vehicle and more particularly, to an improved controllable one-way clutch for a vehicle, which functions as a one-way clutch and does not transfer the driving force in any direction when the hydraulic pressure terminates.

2. Description of Related Art

Generally, one-way clutches inserted between a driven race and a driving race for transferring the driving force in a one-way direction are well known in the art. An example of the known art is utilized in an automatic transmission.

Figure 4:
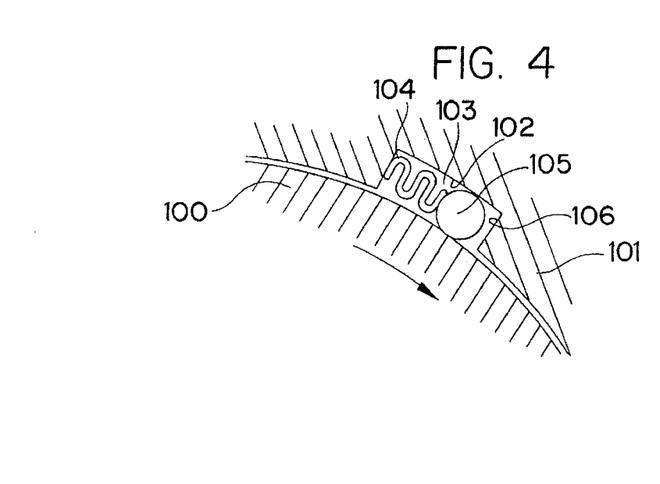
FIG. 4 is a sectional view of the conventional one-way clutch.

Such a conventional clutch comprises an inner race 107 and an outer race 101 as shown in FIG. 4. A groove 103 is formed in the inner side of the outer race 101, the groove 103 having a narrow opening with sidewalls 106 and a facing wall 102. The groove 103 includes a spring 104 and a roller 105 connected to the spring 104.

When the inner race 107 rotates in the clockwise direction, the roller 105 rolls in the groove 103 with the roller 105 inserted between the facing wall 102 and the inner race 107. Therefore, because of a wedge function, the driving force can be transferred from the inner race 107 to the outer race 101.

On the contrary, when the inner race 107 rotates in the counter-clockwise direction, the roller 105 is released from the wedge operation. Therefore, the driving force cannot transfer from the inner race 107 to the outer race 101.

Figure 13:
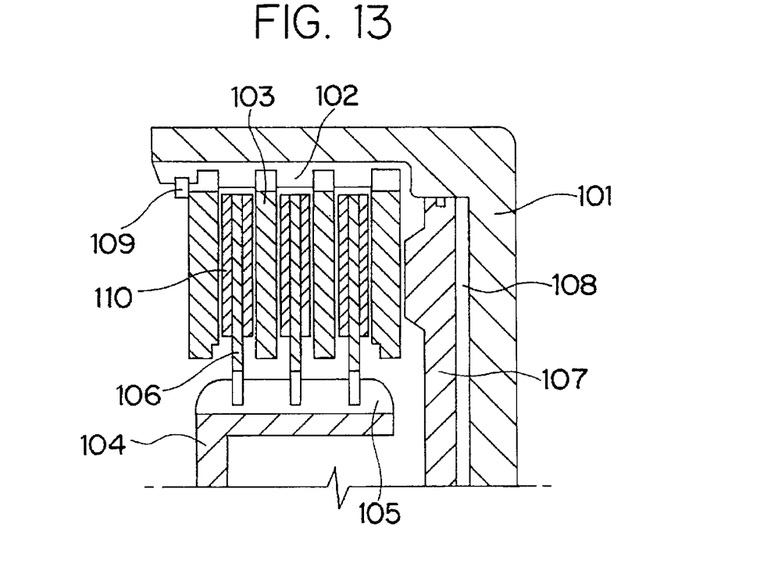
FIG. 13 is a sectional view of a conventional multiplate clutch.

As shown in FIG. 13, a conventional multiplate clutch is provided for use in an automatic transmission of a motorcycle and an automobile. The conventional multiple clutch comprises a plurality of clutch plates 117 vertically disposed in an uneven inner wheel 115 of a clutch retainer 114, and a plurality of clutch discs 112 vertically disposed in an uneven outer wheel 111 of a hub 116 such that the clutch discs 112 are disposed within the clutch plates 117.

When hydraulic pressure is supplied to a cylinder 108, a piston 113 in the clutch retainer 114 pushes against the clutch plates 117 so that the clutch discs 112 are compressed and the driving force transfers. Also, the clutch plates 117 cannot be separated from the clutch retainer 114 and a friction material 110 attaches to both sides of the clutch discs 112.

However, such conventional one-way clutches suffer from a number of problems, such as for example, it is very difficult to allow a loose rotation in both directions, it is expensive to manufacture since it requires a number of parts such as a plurality of clutch plates and clutch discs, and it is complicated in structure.

SUMMARY OF THE INVENTION

Accordingly, it is an object of the present invention to provide a controllable one-way clutch for a vehicle, which eliminates the above problems encountered with the conventional clutches.

Another object of the present invention is to provide a controllable one-way clutch including a plurality of piston members, a plurality of oil passages communicating with the piston members and a plurality of grooves for receiving a roller from the piston members, which are disposed within an inner race, and an outer race whereby when the oil pressure is supplied to the piston members, the driving force transfers from the inner race to the outer race. On the contrary, when the oil pressure is not supplied to the piston members, the inner race operates a loose rotation and the driving force does not transfer in both directions.

Still another object of the present invention is to provide a controllable one-way clutch which is simple in structure, inexpensive to manufacture, and durable in use.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Referring now in detail to the drawings for the purpose of illustrating preferred embodiments for the present invention, the controllable one-way clutch for a vehicle as shown in FIGS. 1, 2(A), 2(B), and 3, comprises an inner race 1 and an outer race 2 rotatably connected to the inner race 1 wherein one of both races 1 and 2 as a driving axle drives the other race of both races 1 and 2 as a driven axle. For example, a driving force transfers and is controlled between the inner race 1 as a driving axle and the outer race 2 as a driven axle.

Figure 1:
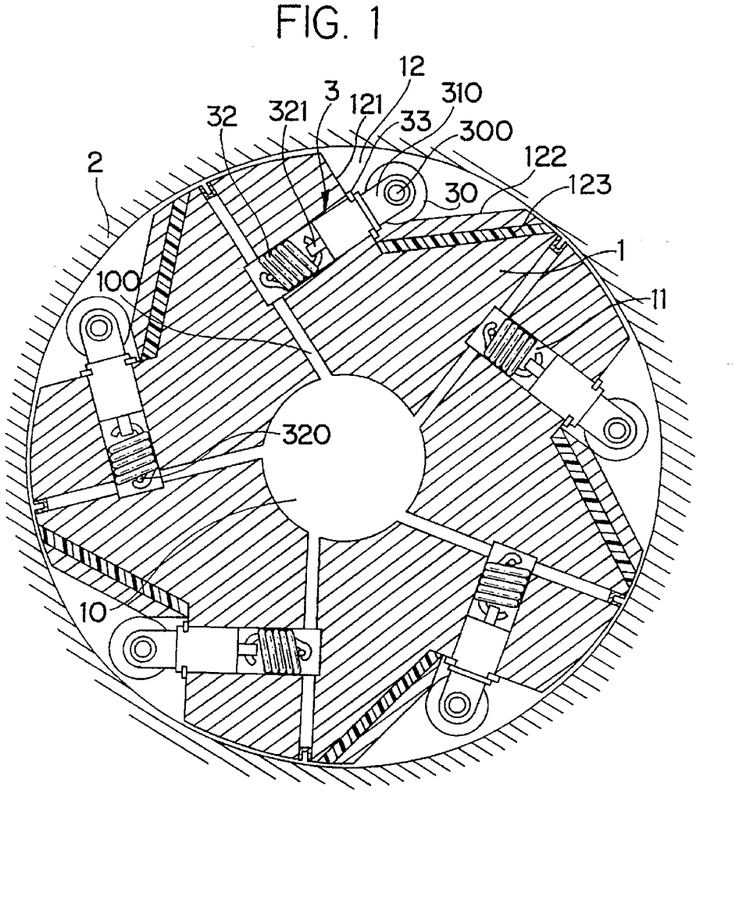
FIG. 1 is a sectional view of the controllable one-way clutch for a vehicle according to the present invention.

The inner race 1 is provided with a main oil passage 10 disposed at a center thereof and a plurality of cylinders 11 disposed outside of the main oil passage 10 in a transverse direction with respect thereto and formed at equivalent distances from each other. Each cylinder 11 opens to the outer race 2 in the driving force transfer direction and is disposed in a groove 12. The outer portion of the cylinder 11 has a perpendicular plane 121 and a cam plane 122 disposed at an obtuse angle with the perpendicular plane 121. The cam plane 122 has an elastic material 123 buried in the rear face thereof for smoothly receiving the rollers 30 on the cam plane 122 and providing a buffer effect. The elastic material is rubber or a similar resilient material. At the inner end portion of the cylinder 11, there is a branch oil passage 100 communicating with the main oil passage 10 and formed in a radial manner in the inner race 1.

Figure 2A:
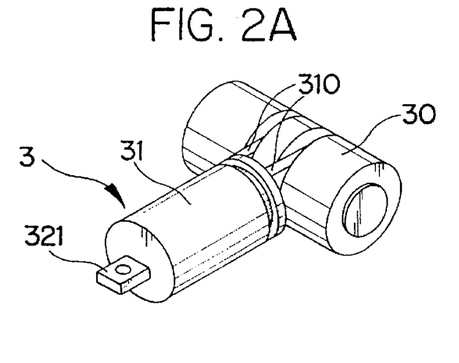
FIG. 2(A) is a perspective view of a piston assembly of the controllable one-way clutch according to the present invention.
Figure 2B:
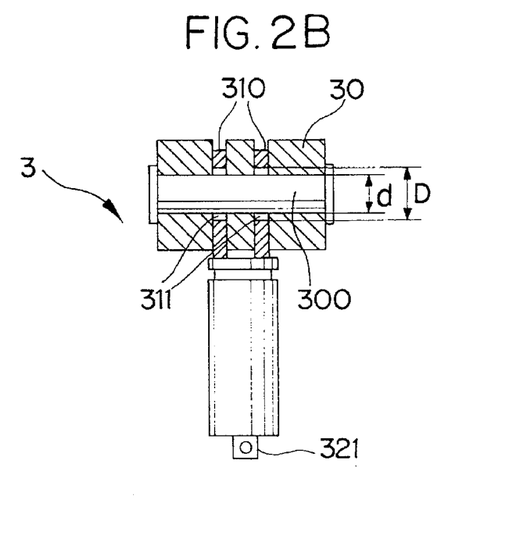
FIG. 2(B) is a front view of the piston assembly according to the present invention containing cut-away portions in order to illustrate the construction thereof.

As shown in FIGS. 2(A) and 2(B), the cylinder 11 includes a piston assembly 3 disposed at the outer portion thereof. The piston assembly 3 includes a piston 31 having a pair of fixing rings 310 rotatably assembled with a roller 30 at a front portion, and a spring engagement 321 at a rear portion thereof. The outside diameter d of a roller shaft 300 is less than the inside diameter D of the pair of fixing rings 310 as shown in FIG. 2(B) for smoothly rotating the roller shaft 300 in the pair of fixing rings 310.

A plurality of rollers 30 are required in the present invention, preferably three to eight rollers 30, and more preferably five rollers 30 for forming a large surface so as to improve the traction effect and the scattering effect of contact stress.

The piston 31 is biased by a return spring 32 which is connected to a spring pin 320 fixed to the walls of the cylinder 11 and the spring engagement 321 extending from the piston 31. The piston 31 has a ring stopper 33 disposed on the upper portion thereof for limiting the insertion of the piston 31 into the cylinder 11. The return spring 32 always pulls the piston 31 toward the inside of the inner race 1.

Therefore, when the hydraulic pressure is supplied to the cylinder 11 through the main and branch oil passages 10 and 100, the piston assembly 3 extends toward the outside of the inner race 1. At this time, the roller 30 seats between the cam plane 122 and the inside diameter of the outer race 2 so that the roller 30 functions as a kind of wedge and simultaneously the inner race 1 and the outer race 2 become a composite structure such that the transfer of driving force is accomplished as shown in FIG. 3.

As shown in FIG. 1, the controllable one-way clutch according to the present invention provides a large number such as five clutches disposed on the inner race 1 at an equivalent distance from each other.

The controllable one-way clutch according to the present invention operates as follows. As shown in FIG. 3, when the rotating force of the outer race 2 is to transfer to the inner race 1, a certain hydraulic pressure is supplied into the cylinder 11 through the main and branch oil passages 10 and 100.

Figure 3:
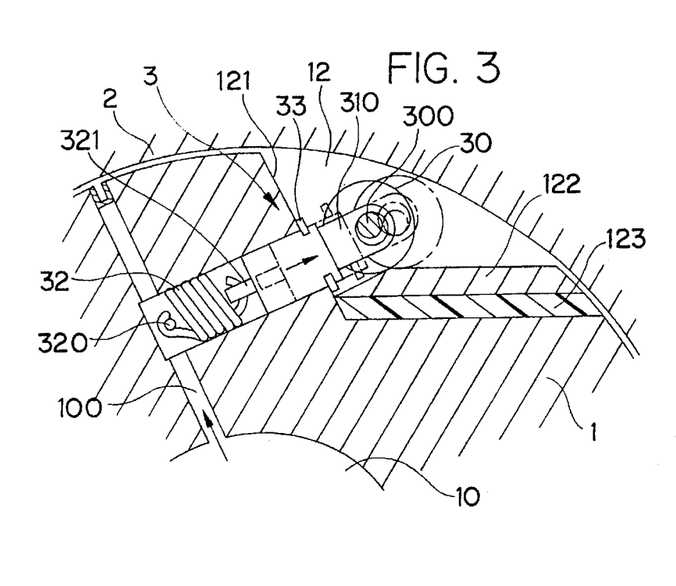
FIG. 3 is a sectional view of the controllable one-way clutch according to the present invention showing the operation thereof.

At that time, the supplied hydraulic pressure in the cylinders 11 pushes the piston assemblies 3 toward the outer side in the direction indicated by an arrow from the real line position to the dotted line position (FIG. 3). Thus, when the piston assemblies 3 extend toward the outer side, the rollers 30 contact the inside surface of the outer race 2.

Thereafter, the rollers 30 move along the inside surface of the outer race 2 and go down, and immediately contact the surface of the cam planes 122. Therefore, the rollers 30 are seated between the inside diameter of the outer race 2 and the cam planes 122 in the grooves 12 of the inner race 1.

Accordingly, when the rollers 30 are inserted between the outer race 2 and the cam planes 122 in the grooves 12 of the inner race 1, the rotating force of the outer race 2 can easily and effectively transfer to the inner race 1.

In this process of the driving force transfer, when the outer race 2 rotates in the clockwise direction, if the hydraulic pressure is supplied to the cylinders 11, the rollers 301 seat between the outer race 2 and the cam planes 122 of the inner race and the transfer of the driving force is accomplished. On the contrary, when the outer race 2 rotates in the counter-clockwise direction, if the hydraulic pressure is supplied to the cylinders 11, the rollers 30 do not seat between both inner and outer races 1 and 2 and the transfer of the driving force is not accomplished. Even if the hydraulic pressure actuates, the rollers 30 push to the inside of the inner race and downwardly.

When the hydraulic pressure closes, the piston assemblies 3 are returned to the original position by bias of the return springs 32. Therefore, the transfer of the driving force does not proceed regardless of the rotating direction of the outer race 2.

Accordingly, the controllable clutch for a vehicle according to the present invention is simple in structure, inexpensive to manufacture, and easy to use. Furthermore, the controllable clutch for a vehicle according to the present invention functions as a one-way clutch function and can easily close the driving force transfer regardless of the rotating direction of the outer race when the hydraulic pressure closes.

Figure 5:
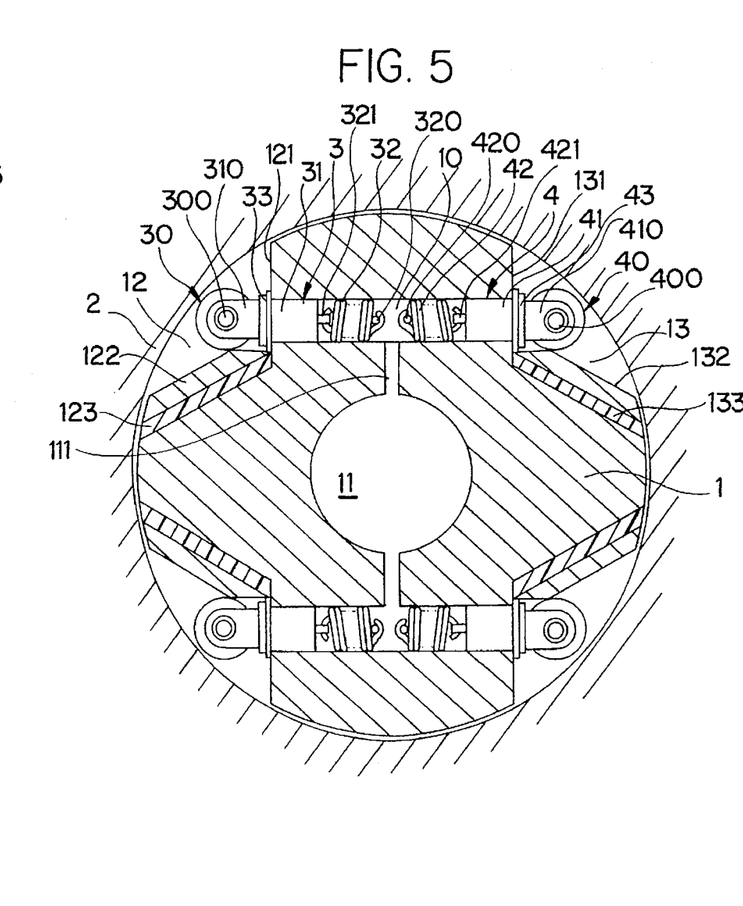
FIG. 5 is a sectional view of a second embodiment of the controllable one-way clutch according to the present invention.
Figure 6:
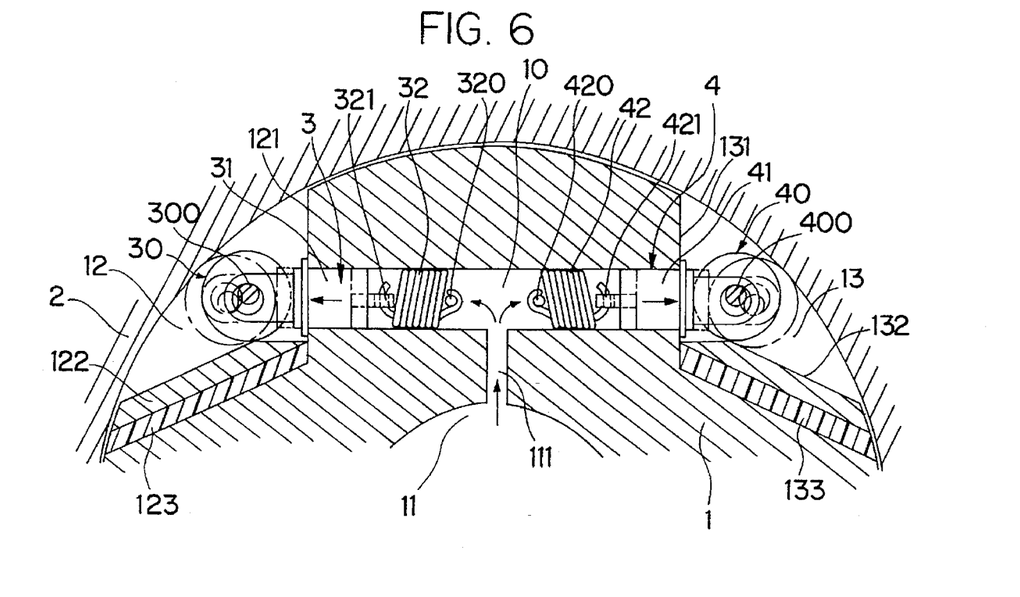
FIGS. 6 and 7 are sectional views of the second embodiment of the controllable one-way clutch according to the present invention showing the operation thereof.
Figure 7:
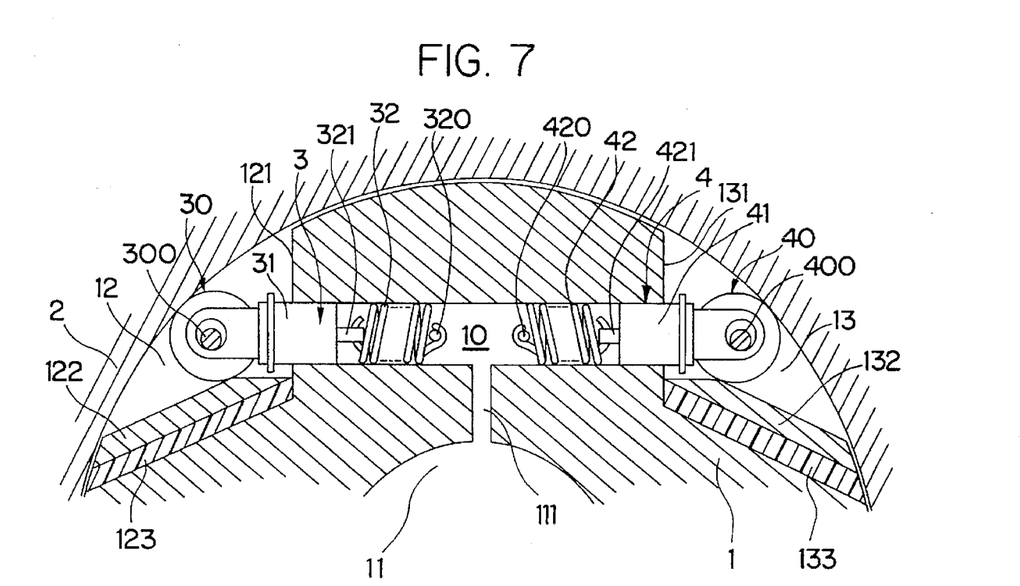

Referring in detail to FIGS. 5, 6, and 7, there is illustrated a second embodiment of a controllable clutch for a vehicle in accordance with the present invention. The controllable clutch comprises the inner race 1 and the outer race 2.

The inner race 1 is provided with the main oil passage 10 disposed at a center thereof and a pair of cylinders 11 disposed at both sides of the main oil passages 10. Each cylinder 11 opens to the outer race 2 in one of the two driving force transfer directions and is disposed in a groove 12. The outer portion of the cylinder 11 has a perpendicular plane 121 and a cam plane 122 disposed at an obtuse angle with the perpendicular plane 121. The cam plane 122 has an elastic material 123 buried in the rear face thereof for smoothly receiving the roller 30 on the cam plane 122 and providing a buffer effect. At the inner center portion of each cylinder 11, there is a branch oil passage 100 communicating with the main oil passage 10 and formed at a right angle to the cylinder 11, in the inner race 1.

As shown in FIGS. 2(A) and 2(B), the piston assembly 3 of the second embodiment is the same as that of the first embodiments, that is, the cylinder 11 comprises the piston assembly 3 which includes the piston 31 having the pair of fixing rings 310 rotatably assembled with the roller 30 at a front portion, and the spring engagement 321 at a rear portion thereof. The pair of piston assemblies 3 become one composite product which communicates with the branch oil passage 100.

A plurality of rollers 30 are required in this second embodiment of the present invention, preferably four rollers 30 for forming a large surface so as to improve the traction effect and the scattering effect of contact stress. As shown in FIG. 5, the piston 31 is the same as the first embodiment, and is biased by the return spring 32 which is connected to the spring pin 320 fixed to the walls of the cylinder 11 and the spring engagement 321 extending from the piston 31. The piston 31 has the ring stopper 33 disposed on the upper portion thereof for limiting the insertion of the piston 31 into the cylinder 11. The return spring 32 always pulls the piston 31 toward the inside of the inner race 1.

Therefore, as shown in FIG. 6, when the hydraulic pressure is supplied to the cylinder 11 through the main and branch oil passages 10 and 100, the piston assembly 3 extends toward the outside of the inner race 1. At this time, the roller 30 seats between the cam plane 122 and the inside diameter of the outer race 2 so that the roller 30 functions as a kind of wedge and simultaneously the inner race 1 and the outer race 2 become a composite structure such that the transfer of driving force is accomplished as shown in FIG. 7.

As shown in FIG. 5, the controllable clutch according to the present invention provides a large number such as four clutches disposed on the inner race 1 at an equivalent distance from each other.

The controllable clutch according to the present invention operates as follows. As shown in FIGS. 6 and 7, when the rotating force of the outer race 2 is to transfer to the inner race 1, a certain hydraulic pressure is supplied into the cylinder 11 through the main and branch oil passages 10 and 100.

At that time, the supplied hydraulic pressure in the cylinder 11 pushes the piston assemblies 3 toward the outer side in the direction indicated by an arrow from the real line position to the dotted line position (FIG. 6). Thus, when the piston assemblies 3 extend toward the outer side, the rollers 30 contact the inside surface of the outer race 2.

Thereafter, the rollers 30 move along the inside surface of the outer race 2 and go down, and immediately contact the surface of the cam planes 122. Therefore, the rollers 30 are seated between the inside diameter of the outer race 2 and the cam planes 122 in the grooves 12 of the inner race 1 (FIG. 7).

Accordingly, when the rollers 30 are seated between the outer race 2 and the cam planes 122 in the grooves 12 of the inner race 1, the rotating force of the outer race 2 can easily and effectively transfer to the inner race 1.

In this process of the driving force transfer, when the outer race 2 rotates in the clockwise direction if the hydraulic pressure is supplied to the cylinders 11, the rollers 30 in the upper right hand and lower left hand clutches seat between the outer race 2 and the cam planes 122 of the inner race 1 and the transfer of the driving force is accomplished. The rollers 30 in the upper left hand and lower right hand clutches, however, push to the inside of the inner race 1 and downwardly. When the outer race 2 rotates in the counter-clockwise direction, if the hydraulic pressure is supplied to the cylinders 11, the rollers 30 in the upper left hand and lower right hand clutches seat between both inner and outer races 1 and 2 and the transfer of the driving force is accomplished. Even if the hydraulic pressure actuates, the rollers 30 in the upper right hand and lower left hand clutches push to the inside of the inner race 1 and downwardly.

When the hydraulic pressure closes, the piston assemblies 3 are returned to the original position by bias of the return springs 32. Therefore, the transfer of the driving force does not proceed regardless of the rotating direction of the outer race 2.

Figure 8:
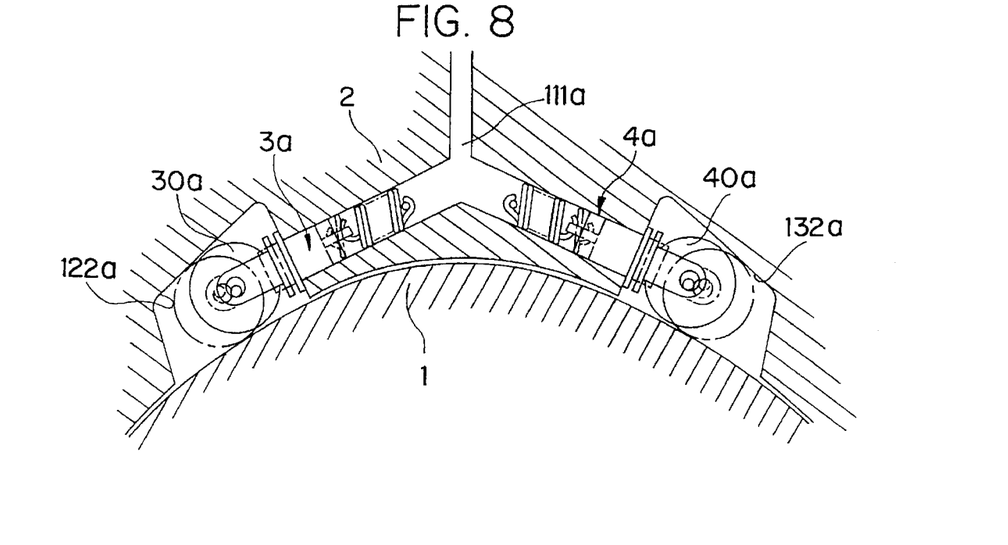
FIG. 8 is a sectional view of a third embodiment of the controllable clutch according to the present invention.

FIG. 8 is a sectional view illustrating a third embodiment of the controllable clutch for a vehicle in accordance with the present invention. The controllable clutch comprises the inner race 1 and the outer race 2.

In this third embodiment of the present invention, piston assemblies 3a are disposed in the outer race 2 and are provided with rollers 30a for smoothly seating between the outer diameter surface of the inner race 1 and cam planes 122a. The pair of piston assemblies 3 become a composite product which communicates with each branch oil passage 100.

In this process of the present driving force transfer, when the inner race 1 rotates in the clockwise direction, the roller 30a on the right hand clutches seats between the inner race and the cam planes 122a of the outer race 2, and the transfer of the driving force is accomplished. The roller 30a on the left hand clutch, however, pushes to the inside of the outer race 2 and upwardly. When the outer race 2 rotates in the counter-clockwise direction, if the hydraulic pressure is supplied to the cylinders 11, the roller 30a on the left hand clutch seats between both inner and outer races 1 and 2 and the transfer of the driving force is accomplished. Even if the hydraulic pressure actuates, the roller 30a on the right hand side pushes to the inside of the outer race 2 and upwardly.

Figure 9:
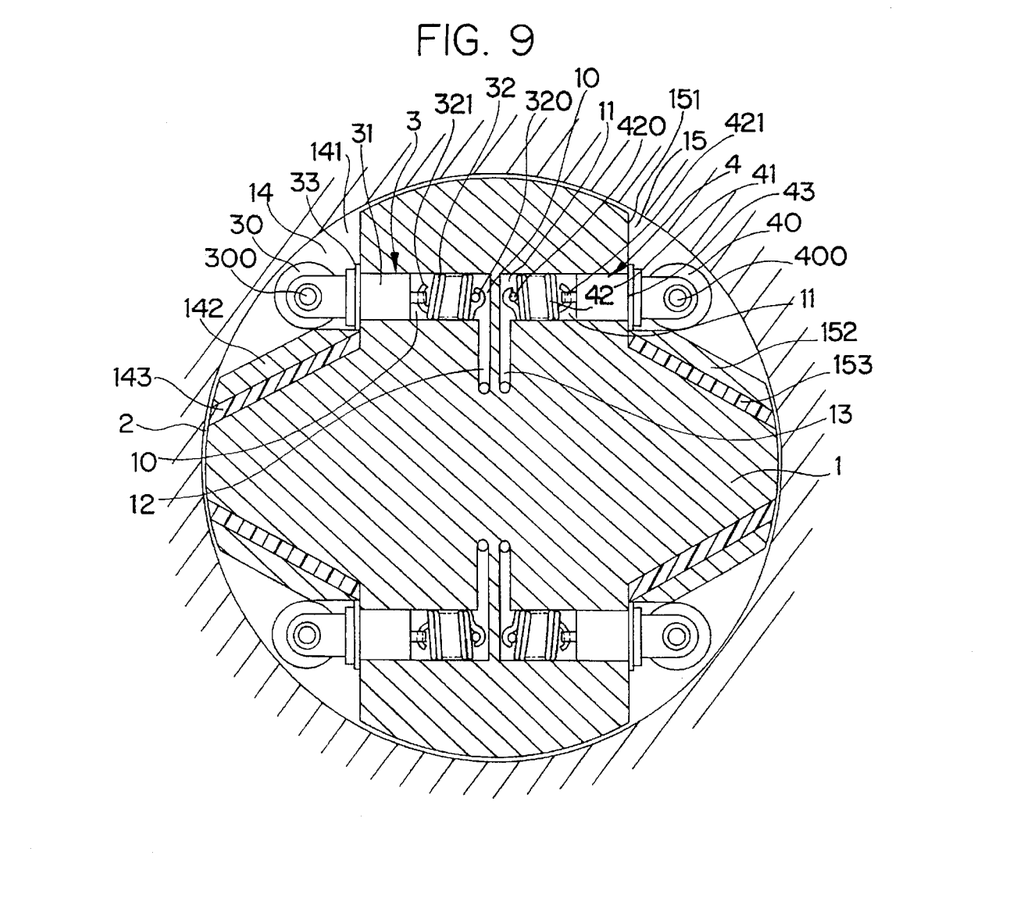
FIG. 9 is a sectional view of a fourth embodiment of the controllable clutch according to the present invention.
Figure 10:
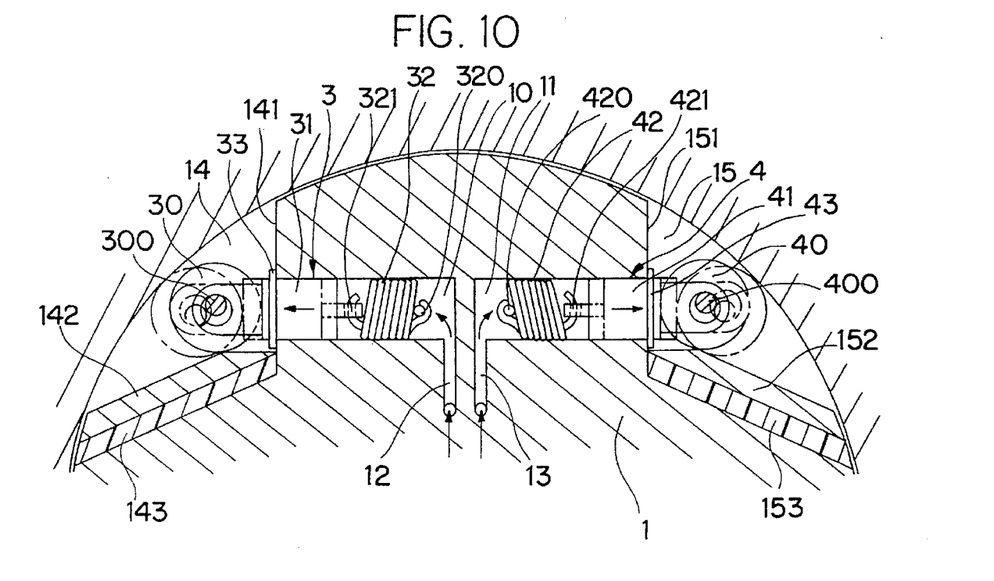
FIGS. 10 and 11 are sectional views of the fourth embodiment of the controllable clutch according to the present invention.
Figure 11:
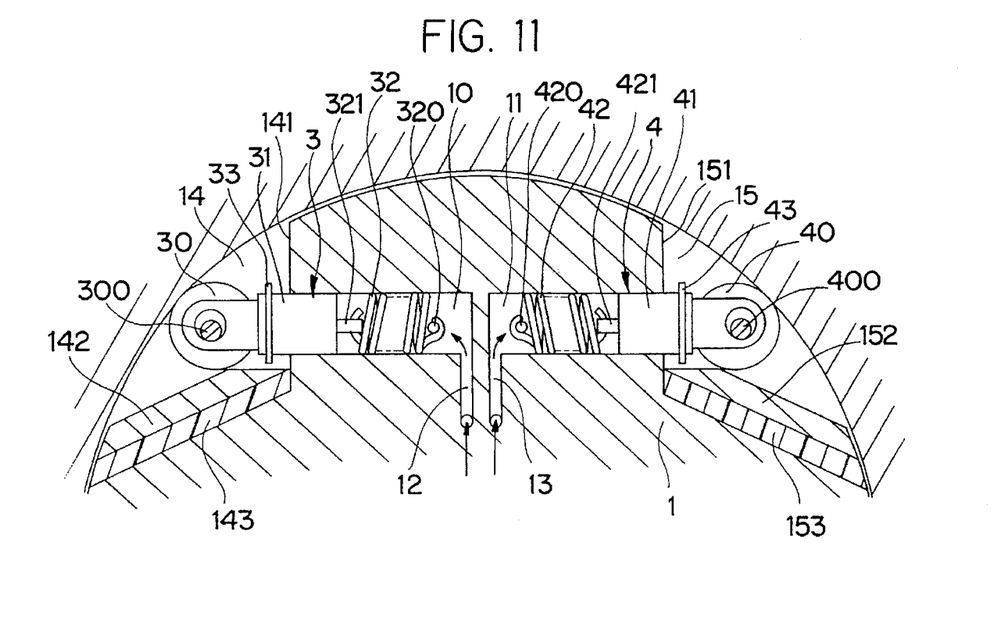

Referring now in detail to FIGS. 9, 10, and 11, there is illustrated a fourth embodiment of the controllable clutch for a vehicle in accordance with the present invention. The controllable clutch comprises the inner race 1 and the outer race 2.

The inner race 1 is provided with two pairs of branch oil passages 100 disposed at a center portion thereof and two pairs of cylinders 11 disposed at both sides of the branch oil passages 100. Each cylinder 11 opens to the outer race 2 in one of the two driving force transfer direction and is disposed within the groove 12. The outer portion of the cylinder 11 has the perpendicular plane 121 and the cam plane 122 disposed at an obtuse angle with the perpendicular plane 121.

Each cam plane 122 has the elastic material 123 buried in the rear face thereof for smoothly receiving the roller 30 against the cam plane 122 and providing a buffer effect. Each cylinder 11 communicates with the branch oil passage 100 which is formed at a right angle to the cylinder 11 in the inner race 1.

As shown in FIGS. 2(A) and 2(B), the piston assembly 3 of the fourth embodiment is the same as that of the first embodiments, that is, the cylinder 11, the piston assembly 3 which includes the piston 31 having the pair of fixing rings 310 rotatably assembled with the roller 30 at a front portion, and the spring engagement 321 at a rear portion thereof.

A plurality of rollers 30 are required in this fourth embodiment of the present invention, preferably four rollers 30 for forming a large surface so as to improve the traction effect and the scattering effect of contact stress.

As shown in FIG. 11, the piston 31 is biased by the return spring 32 which is connected to the spring pin 320 fixed to the walls of the cylinder 11 and the spring engagement 321 extended from the piston 31. The piston 31 has the ring stopper 33 disposed on the upper portion thereof for limiting the insertion of the piston 31 into the cylinder 11. The return spring 32 always pulls the piston 31 toward inside of the inner race 1.

Therefore, when the hydraulic pressure is supplied to the cylinder 11 through the branch oil passage 100, the piston assembly 3 extends toward the outside of the inner race 1. If the cylinder 11 opens to the outer race 2 in the driving force transfer direction, the roller 30 seats between the cam plane 122 and the inside diameter of the outer race 2 so that the roller 30 functions as a kind of wedge and simultaneously the inner race 1 and the outer race 2 become a composite structure and the transfer of driving force is accomplished as shown in FIG. 11.

As shown in FIGS. 10 and 11, the controllable one-way clutch according to the present invention provides a great number such as four clutches disposed on the inner race 1 at an equivalent distance from each other.

The controllable clutch according to the present invention operates as follows. As shown in FIG. 10, when the rotating force of the outer race 2 is to be transferred to the inner race 1, a certain hydraulic pressure is supplied into the cylinder 11 through the branch oil passages 100.

At that time, the supplied hydraulic pressure in the cylinder 11 pushes the piston assemblies 3 toward the outer side in the direction indicated by an arrow from the real line position to the dotted line position (FIG. 10). Thus, when the piston assemblies 3 extend toward the outer side, the rollers 30 contact the inside surface of the outer race 2. Thereafter, the rollers 30 extending from cylinders 11 opening to the driving force transfer direction move along the inside surface of the outer race 2 and go down, and immediately contact the surface of the cam planes 122. Therefore, these rollers 30 are seated between the inside diameter of the outer race 2 and the cam planes 122 in the grooves 12 of the inner race (FIG. 11).

Accordingly, when these rollers 30 are seated between the outer race 2 and the cam planes 122 in the grooves 12 of the inner race 1, the rotating force of the outer race 2 can easily and effectively transfer to the inner race 1.

In this process of the driving force transfer, when the outer race 2 rotates in the clockwise direction if the hydraulic pressure is supplied to all the cylinders 11, the rollers 30 of the upper right hand and lower left hand clutches seat between the outer race 2 and the cam planes 122 of the inner race and the transfer of the driving force is accomplished. The rollers 30 of the upper left hand and lower right hand clutches, however, do not seat between the inner race 2 and outer 2. Instead, these rollers 30 push to the inside of the inner race 1 and downwardly. When the outer race 2 rotates in the counter-clockwise direction if the hydraulic pressure is supplied to the cylinders 11, the rollers 30 of the upper left hand arch to the right hand clutches seat between both inner and outer races 1 and 2 and the transfer of the driving force is accomplished. Even if the hydraulic pressure actuates, the rollers 30 of the upper right hand and lower left hand clutches do not seat between the inner race 1 and outer race 2. Instead, these rollers 30 push to the inside of the inner race 1 and downwardly.

When the hydraulic pressure closes, the piston assemblies 3 are returned to the original position by bias of the return springs 32. Therefore, the transfer of the driving force does not proceed regardless of the rotating direction of the outer race 2.

Furthermore, as shown in FIGS. 9-11, the cylinders 11 of the clutches are independently and separately supplied with hydraulic fluid via an associated branch oil passage 100. By selectively supplying hydraulic fluid only to the branch oil passages 100 for the upper right hand and lower left hand clutches, a controllable one-way clutch in the clockwise direction is formed assuming the outer race 2 applies the transfer driving force. Likewise, by selectively supplying hydraulic fluid only to the branch oil passages 100 for the upper left hand and lower right hand clutches, a controllable one-way clutch in the counter-clockwise direction is formed assuming the outer race 2 applies the transfer driving force. In other words, by supply hydraulic fluid to the branch oil passages 100 associated with the cylinders 11 opening in one of the clockwise and counter-clockwise direction, a one-way clutch can be formed in that direction assuming the outer race 2 applies the transfer driving force.

Figure 12:
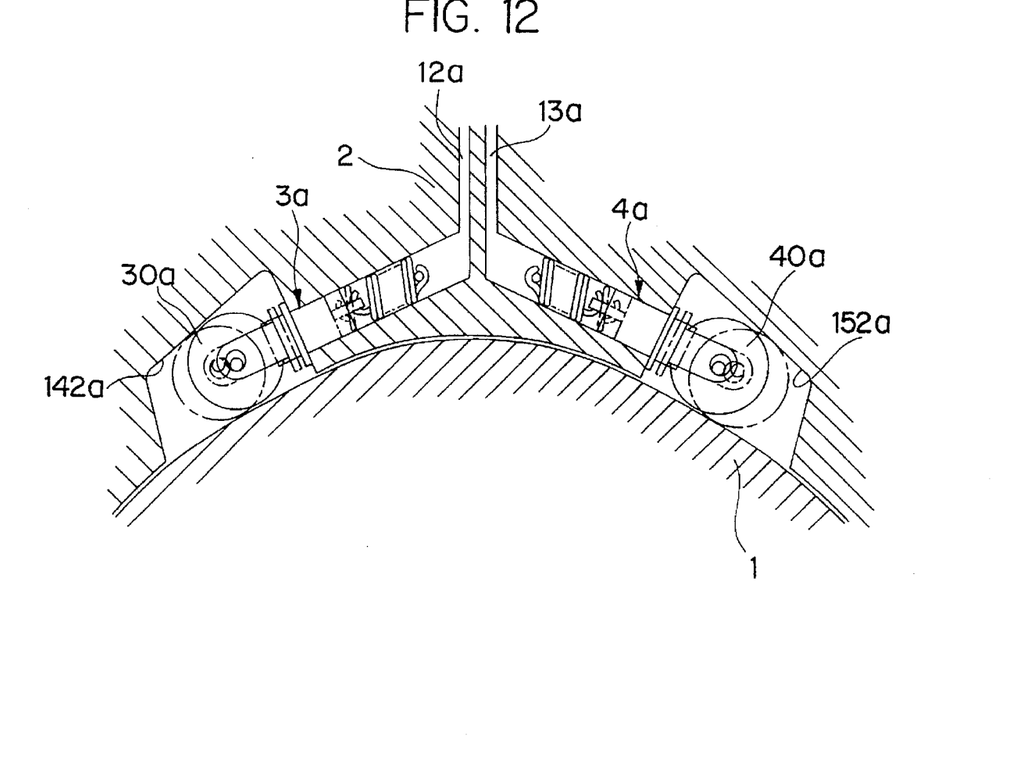
FIG. 12 is a sectional view of a fifth embodiment of the controllable clutch according to the present invention.

FIG. 12 is a sectional view illustrating a fifth embodiment of the controllable clutch for a vehicle in accordance with the present invention. The controllable clutch comprises the inner race 1 and the outer race 2.

In this fifth embodiment of the present invention, piston assemblies 3a are disposed in the outer race 2 and are provided with rollers 30a for smoothly seating between the outer diameter surface of the inner race 1 and cam planes 122a. Each piston assembly 3a communicates with an associated branch oil passage 100.

When hydraulic fluid is supplied to both of the branch oil passages, the inner race 1 rotates in the clockwise direction, the roller 30a of the right hand clutch seats between the inner race 1 and the cam planes 122a of the outer race 2, and the transfer of driving force is accomplished. The roller 30a of the left hand clutch, however, does not seat between the inner race 1 and the cam planes 122a. Instead, this roller 30a pushes to the inside of the outer race 2 and upwardly.

When the inner race 1 rotates in the counter-clockwise direction, if the hydraulic pressure is supplied to the cylinders 11, the rollers 30 of the left hand clutch seats between both inner and outer races 1 and 2 and the transfer of the driving force is accomplished. Even if the hydraulic pressure actuates, the roller 30 of the right hand clutch does not seat between the inner race 1 and outer race 2. Instead, this roller 30a pushes to the inside of the outer race 2 and upwardly. Furthermore, as with the fourth embodiment, a controllable one-way clutch in either the clockwise or counter-clockwise direction could be formed by selectively supply hydraulic fluid to only one of the branch oil passages 100a for the right hand clutch and left hand clutch, respectively. In other words, by supplying hydraulic fluid to the branch oil passage 100a associated with the cylinder 11 which opens to the inner race 1 in one of the clockwise or counter-clockwise directions, a one-way clutch can be formed in that direction assuming the inner race 1 applies the transfer driving force.

Accordingly, the second, third, fourth, and fifth embodiments of the controllable clutch for a vehicle according to the present invention are simple in structure, inexpensive to manufacture, and easy to use. Furthermore, the present controllable clutches for a vehicle according to the present invention function as a clutches, or selectively as one-way clutches, and easily close the driving force transfer regardless of the rotating direction of the outer race or the inner race.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controllable one-way clutch for a vehicle, including an inner race and an outer race directly confronting said inner race for transferring a driving force therebetween, said controllable one-way clutch comprising:

a main oil passage disposed at a center portion of said inner race;

a plurality of branch oil passages communicating with said main oil passage, radially disposed in said inner race, and extending from said main oil passage; and a plurality of piston members disposed within said inner race, each of said plurality of piston members including a cylinder, a return spring, a piston, and at least one roller, said cylinder communicating with said branch oil passage, and said at least one roller being disposed within a groove which is formed at an outer periphery of said inner race and facing said outer race, said groove having a first plane perpendicular to a longitudinal axis of each said piston member and a cam plane directly communicating with and disposed at an obtuse angle with respect to said first plane, whereby when a hydraulic pressure is supplied to the piston members through the branch oil passages, rollers seat between the outer race and the cam planes of the inner race and function as a one-way clutch for transferring the driving force to the outer race, and for easily terminating the driving force when the hydraulic pressure closes.

2. The controllable one-way clutch of claim 1, wherein said plurality of piston members are located at a right angle with respect to said plurality of branch oil passages.

3. The controllable one-way clutch of claim 1, wherein said piston has a fixing ring extending from the end portion thereof for rotatably receiving a roller shaft of said roller so as to smoothly move along the cam plane since the diameter of said roller shaft is less than the diameter of said fixing ring.

4. The controllable one-way clutch of claim 1, comprising three piston members.

5. The controllable one-way clutch of claim 4, comprising five piston members.

6. The controllable one-way clutch of claim 4, wherein said plurality of piston members have an equivalent distance between adjacent piston members.

7. The controllable one-way clutch of claim 1, wherein said cam plane is provided with an elastic material buried behind said cam plane for providing a smooth surface.

8. The controllable one-way clutch of claim 7, wherein said elastic material is rubber.

9. The controllable one-way clutch of claim 3, wherein each of said plurality of piston members are located at a right angle with respect to said plurality of branch oil passages.

10. The controllable one-way clutch of claim 3, comprising three piston members.

11. The controllable one-way clutch of claim 3, comprising five piston members.

12. The controllable one-way clutch of claim 10, wherein each of said plurality of piston members have an equivalent distance between adjacent piston members.

13. The controllable one-way clutch of claim 3, wherein said cam plane is provided with an elastic material buried behind said cam plane for providing a smooth surface.

14. The controllable one-way clutch of claim 13, wherein said elastic material is rubber.

15. The controllable one-way clutch of claim 7, wherein said plurality of piston members are located at a right angle with respect to said plurality of branch oil passages.

16. The controllable one-way clutch of claim 7, wherein each of said plurality of piston members has a fixing ring extending from the end portion thereof for rotatably receiving a roller shaft of said roller so as to smoothly move along said cam plane since the diameter of said roller shaft is less than the diameter of said fixing ring.

17. The controllable one-way clutch of claim 7, comprising three piston members.

18. The controllable one-way clutch of claim 7, comprising five piston members.

19. The controllable one-way clutch of claim 17, wherein each of said plurality of piston members have an equivalent distance between adjacent piston members.

20. The controllable one-way clutch of claim 1, wherein said plurality of piston members are disposed within said inner race such that each piston of said plurality of piston members extends in a same rotational direction.

21. The controllable one-way clutch of claim 20, wherein said rotational direction is clockwise.

22. A controllable clutch for a vehicle, including an inner race and an outer race directly confronting said inner race for transferring a driving force therebetween, said controllable clutch comprising:

a main oil passage disposed at a center portion of said inner race;

a plurality of branch oil passages communicating with said main oil passage and disposed in said inner race, extending from said main oil passage; and at least two pairs of piston members disposed within said inner race, each of said piston members including a cylinder, a return spring, a piston, and at least one roller, said cylinder communicating with one of said branch oil passages, and said at least one roller being disposed within a groove which is formed at an outer periphery of said inner race and facing said outer race, said groove having a first plane perpendicular to a longitudinal axis of a respective piston member and a cam plane disposed at an obtuse angle with respect to said first plane.

23. The controllable clutch of claim 22, wherein said plurality of piston members are located at a right angle with respect to said plurality of branch oil passages.

24. The controllable clutch of claim 22, wherein said piston has a fixing ring extending from the end portion thereof for rotatably receiving a roller shaft of said roller so as to smoothly move along the cam plane since the diameter of said roller shaft is less than the diameter of said fixing ring.

25. The controllable clutch of claim 22, wherein said pair of piston members provide a composite product which communicates with said branch oil passage.

26. The controllable clutch of claim 22, wherein said plurality of piston members have an equivalent distance therebetween.

27. The controllable clutch of claim 22, wherein said cam plane is provided with an elastic material buried behind said cam plane for providing a smooth surface thereof.

28. The controllable clutch of claim 27, wherein said elastic material is rubber.

29. The controllable clutch of claim 24, wherein each piston of said plurality of piston members are located at a right angle with respect to said plurality of branch oil passages.

30. The controllable clutch of claim 24, wherein each of said at least two pair of piston members provide a composite product which communicates with said branch oil passages.

31. The controllable clutch of claim 24, wherein said at least two pairs of piston members have an equivalent distance therebetween.

32. The controllable clutch of claim 24, wherein said cam plane is provided with an elastic material buried behind said cam plane for providing a smooth surface thereof.

33. The controllable one-way clutch of claim 32, wherein said elastic material is rubber.

34. The controllable clutch of claim 27, wherein said plurality of piston members are located at a right angle with respect to said plurality of branch oil passages.

35. The controllable clutch of claim 27, wherein said at least two pairs of piston members provide a composite product which communicates with said branch oil passages.

36. The controllable clutch of claim 27, wherein each of said at least two pairs of piston members have an equivalent distance therebetween.

37. The controllable clutch of claim 27, wherein said elastic material is rubber.

38. The controllable clutch of claim 22, wherein said pairs of piston members are disposed within said inner race such that pistons in each pair of said pairs of piston members extend in a different rotational direction from one another.

39. The controllable clutch of claim 22, wherein each pair of said pairs of piston members shares a common cylinder.

40. A controllable clutch for a vehicle, including an inner race and an outer race directly confronting said inner race for transferring a driving force therebetween, said controllable clutch comprising:

at least two pairs of branch oil passages radially disposed in said inner race; and at least two pairs of piston members disposed within said inner race, each of said piston members including a cylinder, a return spring, a piston and at least one roller, each of said cylinders communicating with a different one of said branch oil passages, and said at least one roller being disposed within a groove which is formed at an outer periphery of said inner race and facing said outer race, said groove having a first plane perpendicular to a longitudinal axis of a respective piston member and a cam plane disposed at an obtuse angle with respect to said first plane.

41. The controllable clutch of claim 40, wherein said piston members are located at a right angle with respect to said plurality of branch oil passages.

42. The controllable clutch of claim 40, wherein said piston has a fixing ring extending from the end portion thereof for rotatably receiving a roller shaft of said roller so as to smoothly move along the cam plane since the diameter of said roller shaft is less than the diameter of said fixing ring.

43. The controllable one-way clutch of claim 40, wherein each of said pair of piston members have an equivalent distance between each other.

44. The controllable clutch of claim 40, wherein said cam plane is provided with an elastic material buried behind said cam plane for providing a smooth surface thereof.

45. The controllable clutch of claim 44, wherein said elastic material is rubber.

46. The controllable clutch of claim 42, wherein each piston of said at least two pairs of piston members is located at a right angle with respect to said plurality of branch oil passages.

47. The controllable clutch of claim 42, wherein each of said at least two pairs of piston members have an equivalent distance therebetween.

48. The controllable clutch of claim 42, wherein said cam plane is provided with an elastic material buried behind said cam plane for providing a smooth surface thereof.

49. The controllable clutch of claim 48, wherein said elastic material is rubber.

50. The controllable clutch of claim 44, wherein each piston of said at least two pairs of piston members are located at a right angle with respect to said plurality of branch oil passages.

51. The controllable clutch of claim 44, wherein said at least two pairs of piston members have an equivalent distance therebetween.

52. The controllable clutch of claim 44, wherein said elastic material is rubber.

53. The controllable clutch of claim 40, wherein each pair of said pairs of piston members includes a first piston member and a second piston member, each piston in said first piston members extends in a first rotational direction, and each piston in said second piston members extends in a second rotational direction opposite said first rotational direction.

54. The controllable clutch of claim 53, wherein each of said branch oil passages supplies hydraulic fluid to one of said first and second piston members in one of said pairs of piston members such that by selectively applying hydraulic fluid to said branch oil passages, said controllable clutch can function as a one-way clutch in one of said first rotational direction and said second rotational direction.

55. A controllable clutch including an inner race and an outer race directly confronting said inner race, said controllable clutch comprising:

at least first and second piston members disposed in said outer race, said first and second piston members including a cylinder, a piston disposed in said cylinder, a roller connected to said piston, and a return spring biasing said piston into said cylinder, said roller being disposed within a corresponding groove formed in a periphery of said outer race and which faces said inner race;

each groove having a first plane perpendicular to a longitudinal axis of a corresponding piston member and a cam plane disposed at an obtuse angle with respect to said first plane; and fluid supply means for supplying hydraulic fluid to said first and second piston members.

56. The controllable clutch of claim 55, wherein said piston in said first piston member extends in a first rotational direction, and said piston in said second piston member extends in a second rotational direction opposite said first rotational direction.

57. The controllable clutch of claim 56, wherein said fluid supply means comprises:

a first branch oil passage supplying hydraulic fluid to said first piston member and a second branch oil passage supplying hydraulic fluid to said second piston member such that by selectively applying hydraulic fluid to said first and second branch oil passages, said controllable clutch can function as a one-way clutch in one of said first rotational direction and said second rotational direction.

58. The controllable clutch of claim 55, wherein said fluid supply means comprises a common branch oil passage for supplying hydraulic fluid to both said first and second piston members.

\* \* \* \* \*